US012681944B2

(12) United States Patent
Hansen et al.

(10) Patent No.: US 12,681,944 B2
(45) Date of Patent: Jul. 14, 2026

(54) WORKFLOW GENERATION SYSTEM

(71) Applicant: Lenovo (United States) Inc.,
Morrisville, NC (US)

(72) Inventors: Andrew Hansen, Raleigh, NC (US);
Xueshi Wang, Cary, NC (US); **Vishal
Kontham Ramdass**, Celina, TX (US);
Sriram C. Thota, Tracy, CA (US);
Hassan Mahini, Cary, NC (US)

(73) Assignee: Lenovo (United States) Inc.,
Morrisville, NC (US)

( * ) Notice: Subject to any disclaimer, the term of this
patent is extended or adjusted under 35
U.S.C. 154(b) by 0 days.

(21) Appl. No.: 18/897,844

(22) Filed: Sep. 26, 2024

(65) Prior Publication Data

US 2026/0087026 A1     Mar. 26, 2026

(51) Int. Cl.
G06F 16/248          (2019.01)
(52) U.S. Cl.
CPC .................................. G06F 16/248 (2019.01)
(58) Field of Classification Search
CPC ..................................................... G06F 16/248
See application file for complete search history.

(56) References Cited

U.S. PATENT DOCUMENTS

| | | | |
|---|---|---|---|
| 2020/0244605 A1* | 7/2020 | Nagaraja ................. | H04L 51/02 |
| | | | 707/737 |
| 2025/0111335 A1* | 4/2025 | Wilson .................. | G06F 3/0482 |
| | | | 707/737 |
| 2025/0111380 A1* | 4/2025 | Wilson ................. | G06Q 30/016 |
| | | | 707/737 |

* cited by examiner

*Primary Examiner* — Yuk Ting Choi
(74) *Attorney, Agent, or Firm* — FERENCE &
ASSOCIATES LLC

(57)          ABSTRACT

One embodiment provides a method, the method including:
receiving, at a workflow generation system, a query from a
user requesting step-by-step instructions corresponding to a
task; producing, utilizing an artificial intelligence model
associated with the workflow generation system, a workflow
based on the query, wherein the workflow comprises the
step-by-step instructions, wherein the producing comprises
accessing documentation related to the task, identifying
within the documentation relevant to the query, and gener-
ating, by aggregating the information, the step-by-step
instructions; and presenting, using a workflow generation
system, the workflow to the user in a user interface. Other
aspects are claimed and described.

18 Claims, 4 Drawing Sheets

— 301

Receive a query from a user requesting step-by-step instructions corresponding to a task

— 302

Produce a workflow based on the query

— 303

Present the workflow to the user in a user interface

WORKFLOW GENERATION SYSTEM

BACKGROUND

To perform tasks that are new to people, the person may refer to an instruction set that includes step-by-step instructions detailing how to perform the task. These instructions may be provided verbally, via text in a book or manual, in person by example, and/or the like. As the world grows more complicated and intricate and people need instructions to perform many different tasks, the techniques for obtaining the instructions has increased and become more accessible to more people. For example, instead of only having a user manual that comes with a product, people can access the Internet and search for written instructions or videos that detail how to perform a task. Additionally, with the increase in virtual assistants or other software applications where a person can enter a prompt or query to which the application will provide a response, a user is able to receive step-by-step instructions for a multitude of tasks with a simple request. These applications may even provide the steps one at a time and only move to the next step when the user has indicated the step has been performed.

BRIEF SUMMARY

In summary, one aspect provides a method, the method including: receiving, at a workflow generation system, a query from a user requesting step-by-step instructions corresponding to a task; producing, utilizing an artificial intelligence model associated with the workflow generation system, a workflow based on the query, wherein the workflow comprises the step-by-step instructions, wherein the producing comprises accessing documentation related to the task, identifying within the documentation relevant to the query, and generating, by aggregating the information, the step-by-step instructions; and presenting, using a workflow generation system, the workflow to the user in a user interface.

Another aspect provides a system, the system including: a processor; a memory device that stores instructions that, when executed by the processor, causes the system to: receive, at a workflow generation system, a query from a user requesting step-by-step instructions corresponding to a task; produce, utilizing an artificial intelligence model associated with the workflow generation system, a workflow based on the query, wherein the workflow comprises the step-by-step instructions, wherein the producing comprises accessing documentation related to the task, identify information within the documentation relevant to the query, and generate, by aggregating the information, the step-by-step instructions; and present, using the workflow generation system, the workflow to the user in a user interface.

A further aspect provides a product, the product including: a computer-readable storage device that stores executable code that, when executed by a processor, causes the product to: receive, at a workflow generation system, a query from a user requesting step-by-step instructions corresponding to a task; produce, utilizing an artificial intelligence model associated with the workflow generation system, a workflow based on the query, wherein the workflow comprises the step-by-step instructions, wherein the producing comprises accessing documentation related to the task, identify information within the documentation relevant to the query, and generate, by aggregating the information, the step-by-step instructions; and present, using the workflow generation system, the workflow to the user in a user interface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
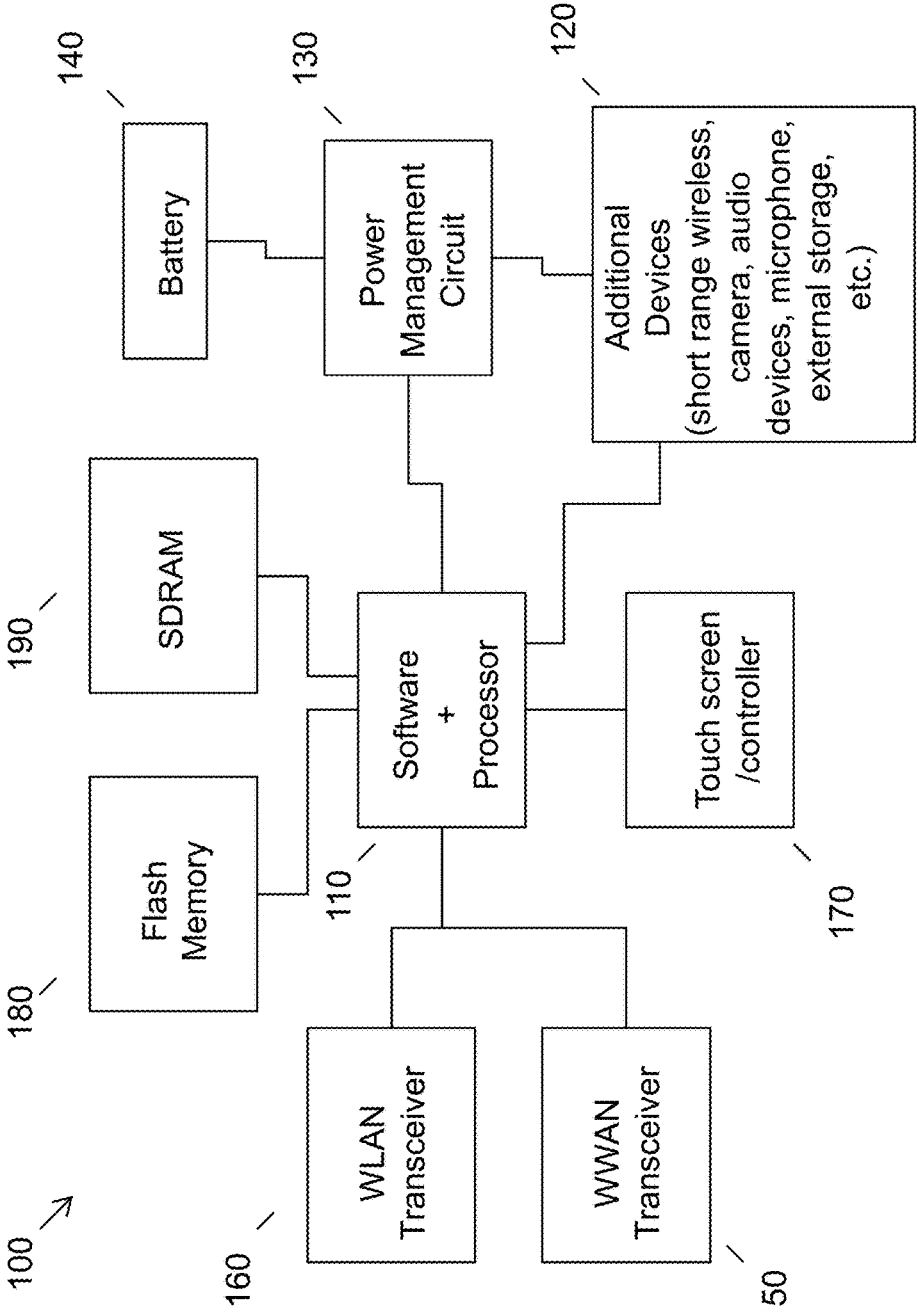
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Following instructions in order to perform a task and achieve a goal are traditionally performed in view of a manual. Anyone who has had to build a piece of furniture, make dinner, install a piece a software, and/or the like, has followed instructions in hopes that whatever actions they perform, a desired result will be reached. As technology increases and evolution of everyday products continues, the need for instructions and how they are provided is trying to keep up. Paper manuals and instructions are still common-place in a lot of aspects of life. However, not all procedures have paper manuals or instructions. Additionally, paper manuals and instructions are easy to misplace and may not be available if a user needs them at a later time.

Thus, electronic instructions are becoming more common and more commonly accessed by users attempting to perform a task. For example, when installing a piece of software on a computer, pop up windows may occur in an order that an action may need to be performed. Additionally, and/or alternatively, when following a recipe, rather than relying on what is present in a cookbook, a person may watch a video explaining the steps. These advances in instruction-types have made life easier in some aspects. However, they fail to account for when a person may have a question that would be resolved with step-by-step instructions. In other words, even if there were written instruction manuals for every-thing, such manuals would not be accessible to every person for every situation where such a manual would be useful. Additionally, when a person is following instructions and has a question regarding some part of the instruction, the person is unable to ask a question of a manual. For example, a person cannot ask an automated software process why an icon that is supposed to be present is not, or ask an internet chef if using olive oil and vegetable oil will yield the same result. What is needed is a system and method that can not only provide step-by-step instructions for performing a task, but that may also accept and respond to questions regarding the instructions in real-time.

Accordingly, the described system and method provides a technique for presenting a workflow to a user in an inter-active user interface by use of a workflow generation system and an associated artificial intelligence model. A workflow generation system present on an information handling device may receive a query from a user requesting step-by-step instructions in relation to a task. The workflow genera-tion system may be associated with an application and/or website currently in use by a user. Additionally, and/or alternatively, the workflow generation system may be accessed through the information handling device being used by a user. After receipt of the query from a user, an artificial intelligence model associated with the workflow generation system may produce a workflow. A workflow may provide steps associated with the query received. In other words, the workflow may provide directions as an answer to or that is responsive to the user query.

In addition to providing the steps for instruction, the workflow may also include any embedded media (e.g., picture, video, icon, graphic, etc.) that may be applicable to a particular step. Thus, instead of providing links to asso-ciated media, as found in some conventional solutions, the described system will embed the media within the workflow so that the user does not have to access a different location to view the media. Each workflow, and the steps provided in response to the query, may be specific to a user's situation. As the artificial intelligence model associated with the workflow generation system ingests the query received from the user, a determination of the steps required to answer the query are formed, and then the workflow generation system may present the workflow containing steps to the user in a user interface.

As a user moves through the workflow provided by the workflow generation system, questions associated with a step in the workflow may arise. When question about a step present in a workflow is present, a user may provide an additional query to the workflow generation system request-ing additional information about the step. Additional information provided in response to the additional query may be an explanation of a step in the workflow. Additionally, and/or alternatively, the additional information provided may include an additional workflow providing one or more steps that may be completed in order for a step of the original workflow to be successfully performed. Then, when it is determined that the additional information associated with the additional query has been supplied and/or performed by the user, the workflow generation system may return back to the original workflow presented and a user may continue to work through that workflow. A user may access a plurality of branches (e.g., additional detail, additional workflows, etc.) while moving through a workflow, while maintaining a location of the originally generated workflow.

The illustrated example embodiments will be best under-stood by reference to the figures. The following description is intended only by way of example, and simply illustrates certain example embodiments.

While various other circuits, circuitry or components may be utilized in information handling devices, with regard to smart phone and/or tablet circuitry 100, an example illus-trated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated cir-cuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Addition-ally, devices 120 are commonly included, e.g., a wireless communication device, external storage, etc. System 100 often includes a touch screen 170 for data input and display/rendering. System 100 also typically includes various memory devices, for example flash memory 180 and syn-chronous dynamic random-access memory (SDRAM) 190.

Figure 2:
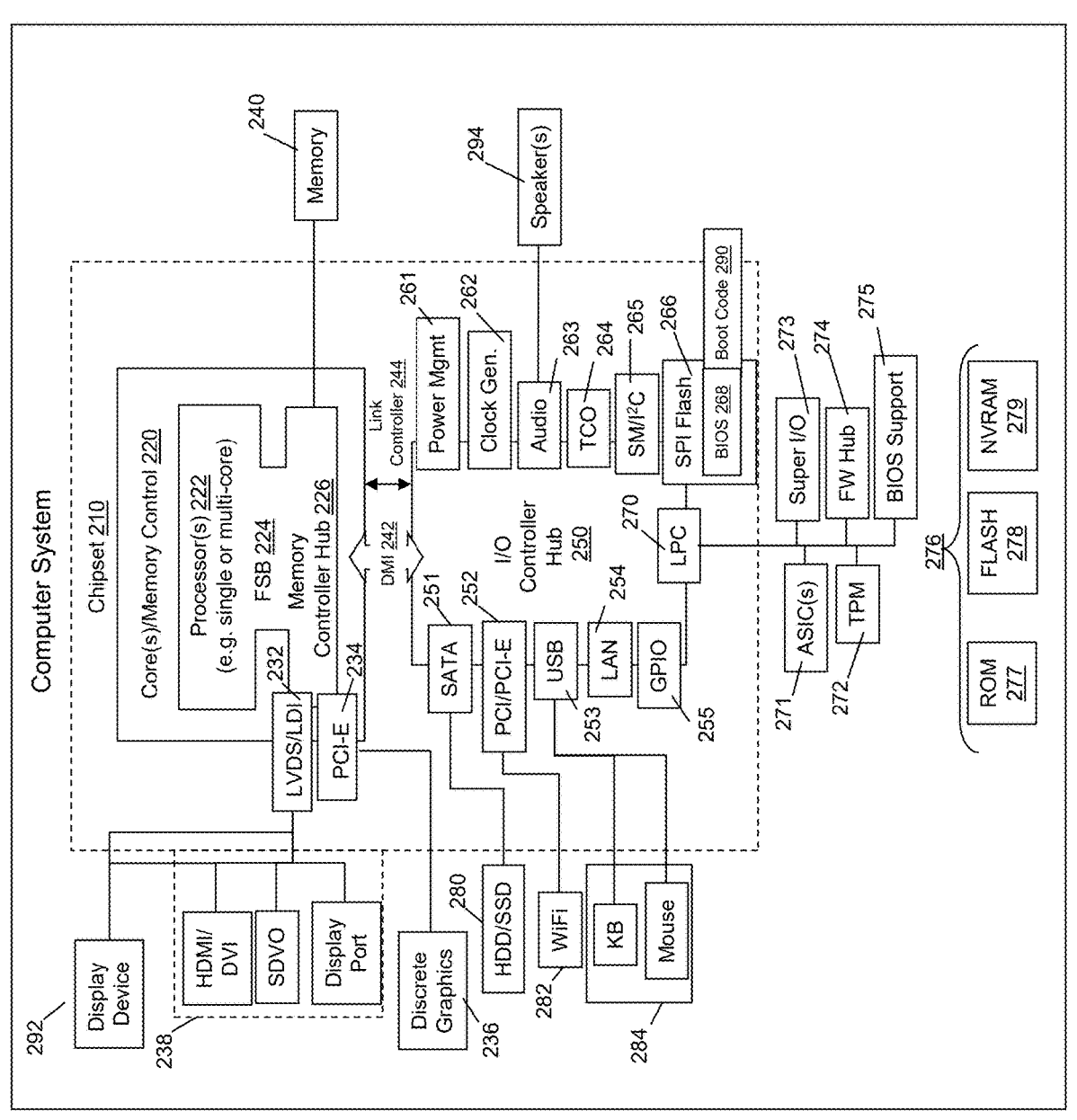
FIG. 2 illustrates another example of information handling device circuitry.

FIG. 2 depicts a block diagram of another example of information handling device circuits, circuitry, or compo-nents. The example depicted in FIG. 2 may correspond to computing systems such as personal computers, or other devices. As is apparent from the description herein, embodi-ments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in devices utilized by users to request provision of a workflow or may be used by devices or applications to support the workflow generation system. For example, the circuitry outlined in FIG. 1 may be implemented in a tablet or smart phone embodiment, whereas the circuitry outlined in FIG. 2 may be implemented in a personal computer embodiment.

Figure 3:
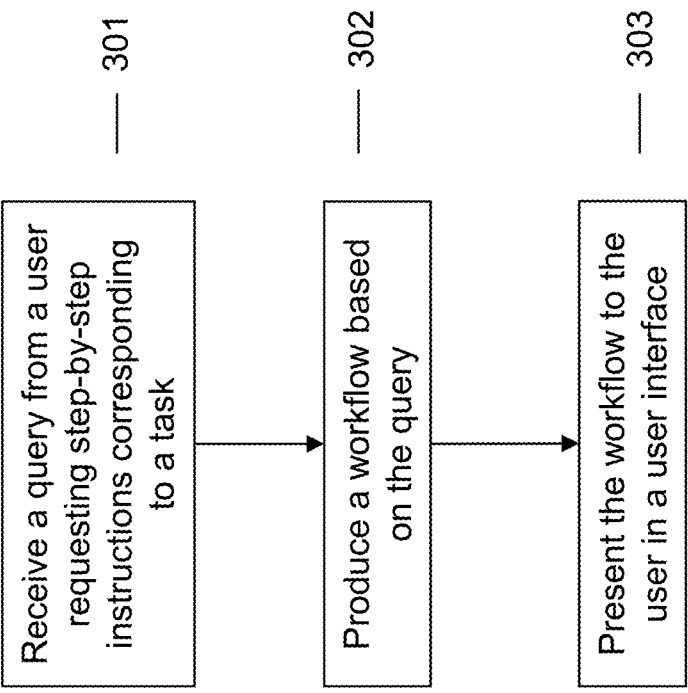
FIG. 3 illustrates an example method for presenting a workflow to a user in a user interface by use of a workflow generation system and an artificial intelligence model.

FIG. 3 illustrates an example method for presenting a workflow to a user in a user interface by use of a workflow generation system and an associated artificial intelligence model. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to receive a query from a user requesting step-by-step instructions corresponding to a task, produce a workflow based on the received query, and present the workflow to a user in a user interface. Additionally, as discussed in connection with FIG. 4, the system is also programmed to respond to questions or additional input by the user while the user is performing the steps of the workflow. Additionally, the workflow generation system includes modules and features that are unique to the described system.

The activation of the workflow generation system may be manual, where a user provides an input indicating that the workflow generation system should be activated, or automatic where the workflow generation system detects a trigger event indicating that the system should be activated. Example trigger events include detection of text input provided at a user interface of an information handling device, voice input occurring while a user is interacting with a user interface, activation of an application associated with the workflow generation system, identifying input requesting generation of a workflow, and/or the like.

The workflow generation system may be a standalone system, may be accessible through other computing devices, and/or a combination thereof. For example, the workflow generation system may be a standalone system that can be accessed by a user and/or may provide an application that is accessible by a user on another computing device. The workflow generation system may be accessible using any type of computing device, for example, personal computer, laptop computer, smartphone, tablet, smartwatch, head-mounted display, smart television or other smart appliance, augmented reality device, virtual reality device, and/or the like. Thus, the workflow generation system may be accessible locally using a computing device where the workflow generation system is installed and/or may be accessible remotely through another computing device. In the latter case, the workflow generation system may be located and operate on a different information handling device to perform the described steps.

The workflow generation system may utilize one or more artificial intelligence models in producing a workflow based on a query, whether that is an initial query to generate an original workflow or the generation of additional information and/or one or more additional workflows produced in response to an additional query provided during the performance of the original workflow. Artificial intelligence models may also be used for steps within a step. For example, a model could be utilized to analyze the query provided by the user to produce the workflow, retrieve additional information from secondary sources to produce the workflow, identify which steps to present at a particular time within the user interface, and/or the like.

Artificial intelligence models can be used when receiving, analyzing, identifying, and/or transcribing input from a user, accessing documentation or secondary sources related to a task, identifying documentation relevant to a query, and/or generating step-by-step instructions for a task. For example, the models can be used to access one or more information storage locations, determine a relevance of collected information to a query, and thereafter, produce a workflow from the information identified as relevant to the query. Artificial intelligence models can also be used in the capturing of the user behavior with respect to performance of the workflow. This may allow the system to determine when the workflow should be advanced, moved back to an original workflow in the case the user is working through a branch workflow, offer assistance if the system determines the user is having issues performing one or more steps of the workflow, and/or the like. Additionally, artificial intelligence models can be used to provide additional information to a user working through an originally presented workflow. Additionally, or alternatively, the artificial intelligence models can be used to perform other steps, assist in performing some of the steps, and/or the like.

For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the workflow generation system or may be a model that is created from scratch. Since the workflow generation system is used in conjunction with generating a workflow from a query, some models that may be utilized by the system are audio analysis models, transcription models, image analysis models, entity identification models, similarity identification models, analysis models, filtering models, classification models, large language models, language models, and/or the like. The model may be trained using one or more training datasets. Additionally, as the model is deployed, it may receive feedback to become more accurate over time. The feedback may be automatically ingested by the model as it is deployed. For example, as the model is used to produce a workflow in response to a query and the user provides an indication that the workflow should be modified or an incorrect workflow was produced, the model ingests this feedback to refine the model.

On the other hand, as the model produces a workflow and/or additional information associated with a step of a generated workflow and the user does not provide an input indicating that the workflow needs to be modified, the model may utilize this as feedback to further refine the model and reinforce the prediction. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The workflow generation system may include different components for carrying out different functions of the system, including different steps to be performed. These components may be hardware components or software components. Some hardware components may include input capturing sensors, audio capturing sensors, output devices (e.g., audio output device, visual output device, etc.), and/or the like. The input capturing sensors and/or the audio capturing sensors may be used to receive a query from a user at the workflow generation system, for example, at a graphical user interface of the workflow generation system. The output devices allow the system to present instructions of a generated workflow to a user in a user interface.

One software component that the system may utilize is a graphical user interface. Specifically, the workflow generation system may have an associated graphical user interface. The graphical user interface may be provided on a display or monitor, which may or may not be associated with the workflow generation system. In other words, the workflow generation system may have a dedicated display or monitor or may be accessible using any display or monitor. In either case, the workflow generation system may provide instructions to generate and display the graphical user interface on the display device being used to access the workflow generation system. The graphical user interface may also be updated and managed based upon instructions provided by the workflow generation system. In other words, the workflow generation system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input to the workflow generation system. The graphical user interface is where the user may provide input to query or prompt the workflow generation system, request additional information related to a presented workflow, indicate when the system should move to a next step within the workflow, adjust presentation of the workflow, and/or the like. Additionally, or alternatively, the user may provide input using a non-text-based input method (e.g., gesture, audio, video, images, etc.) and the system may then transcribe the input into text and present that text within the graphical user interface. The graphical user interface may also allow the user to provide other inputs, for example, inputs identifying information to be used by the workflow generation system. For example, the workflow generation system may utilize a user profile, historical information, and/or the like, to identify when a workflow should be generated by the workflow generation system, when the workflow generation system should get additional information related to the workflow, and/or the like. The graphical user interface may allow for creation of or access to these profiles, historical information, and/or the like, by allowing a user to input information regarding user preferences, secondary source preferences, workflow presentation preferences, and/or the like.

The use of user provided information is not the only way that the profile and/or historical information can be created. For example, artificial intelligence models can be used to create this information, crowd-sourced data can be used to create this information, monitoring user inputs and actions with respect to workflows can be used to create this information, and/or the like. Regardless of how the profile and/or historical information is created, the workflow generation system can then utilize these inputs to create the profile(s), store the historical information, and/or the like.

A user profile is another software component that the system may utilize. The user profile may identify different information related to the user that might be useful to the workflow generation system, for example, a user role, one or more locations of the user, a user identity, demographic information of the user, devices of the user, and/or the like. Additionally, the user profile may identify user preferences with respect to the workflows. For example, the user can identify how workflows should be presented (e.g., a number of steps that are presented at a time, an amount of information presented within a step of the workflow, how the workflow should be presented based upon a device being utilized by the user, etc.), how quickly the steps within the workflow are presented and/or advanced, a layout of the workflows, how the system is allowed to monitor the user throughout a workflow, and/or the like. The user profile may also identify or include any additional information that may be useful to the workflow generation system in generating and presenting workflows.

A user could also use the graphical user interface to adjust information within the profile(s), historical information, workflow presentation, and/or the like. Additionally, or alternatively, the user can input a location of information related to one or more of the profiles, historical information, and/or the like, provide a file corresponding to information related to the information, and/or the like, within the graphical user interface. Input may be provided by the user using any type of input modality, including, but not limited to, mechanical input (e.g., keyboard input, mouse input, etc.), touch input, audible or voice input, gesture input, haptic input, thought input, and/or the like.

The graphical user interface may also provide displays that display information of the profiles, generated workflows, prompts for the user, and/or the like. It should be noted that the information to be used by the workflow generation system and information provided by the workflow generation system can be different for different applications, different computing systems, different users, and/or the like. Thus, the information corresponding to input or output of the workflow generation system are not always the same. However, the workflow generation system may have default or system-wide settings that are the same across different users, systems, applications, and/or the like, until the information is adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

At 301, the workflow generation system may receive a query from a user requesting step-by-step instructions corresponding to a task. A user may be accessing an information handling device that may employ, incorporate, and/or the like, a workflow generation system. The workflow generation system may be accessed while a user is utilizing an application associated with the workflow generation system. Additionally, or alternatively, the workflow generation system may be directly on an information handling device that a user is operating. Additionally, or alternatively, the workflow generation system may be employed on a device that an information handling device currently being utilized by a user is in communication with.

When receiving a query from a user at 301, the user may supply a query utilizing one or more of a plurality of methods. The workflow generation system may be accessible through a user interface that a user is currently interacting with. As previously discussed, the user interface may permit input of a query directly into the user interface, for example, directly into an application that is currently in use. For example, a user that is accessing an information technology support application may permit a user to input a query directly into the support application. Additionally, or alternatively, for example, the user may access an application that is unique to the workflow generation system and provide input, using one or more input modalities, to the user interface associated with the workflow generation system. These examples are intended to be non-limiting examples. As mentioned previously, a workflow generation system may be accessed by utilizing a variety of methods or techniques. Therefore, accessing a user interface associated with a workflow generation system may be performed in a manner separate from the examples listed herein.

Additionally, in receiving a query from a user requesting step-by-step instructions corresponding to a task, the workflow generation system may accept a plurality of query-input types. For example, in the system, the workflow generation system may accept text-input, audio-input, visual-input, and/or the like. As an example, when utilizing a text-input for supplying a query, a user interface that a user is interacting with may include a text-input portion that a user may utilize to type a query for the workflow generation system. Additionally, and/or alternatively, for example, a user interface associated with a workflow generation system may accept audio, or voice-input, from a user that is utilizing a workflow generation system. The workflow generation system may capture what a user is saying as the query for the system. For example, a user interface may include an indication, and/or a wake word, associated with providing an audio-input, and upon detection of the indication, the workflow generation system may listen, transcribe, and accept the received audio-input as a query.

Additionally, and/or alternatively, for example, the workflow generation system may utilize a visual-input method when attempting to receive a user query. For example, upon receiving an indication that a user may want to provide a user visual-input, the workflow generation system may recognize the indication, and during a time period for collection, the system may track user interaction with a display and capture the information a user provides during this time period. For example, a user may select (e.g., highlight, circle with a cursor, etc.) one or more items present on a display and the workflow generation system may treat this selection as a visual-input query. As another example, the user may hold up different objects in view of an image capture device of the system and the system may accept this as a visual-input query. Receiving a query from a user may utilize a single query-input method and/or may utilize a combination of input methods for receiving a query at a workflow generation system.

The query received from a user requesting step-by-step instructions identifies a task that requires one or more directions. In other words, receipt of a query from a user at a workflow generation system may be associated with a task that involves steps to be performed. Rather than simply requesting an answer to a question that may answered with a single answer or response, the workflow generation system identifies steps of a task needing to be performed by a user in order to achieve a desired result. Thus, the query or prompt is one that would result in the generation of such steps, referred to as a workflow. In other words, such a system may identify steps, and/or provide directions, describing what needs to be performed in order to achieve a desired result. The desired result corresponds to the task. In other words, a task is the result that the user wants to achieve or act that the user wants to perform. Thus, example tasks may include zipping a zipper, installing software on a computing device, putting together furniture, changing spark plugs, performing an action on a smartphone or other computing device, or any other task that a user may need assistance with.

After receiving a query from a user at 301, the system may produce a workflow based on the query 302. The workflow generation system may utilize an artificial intelligence model to produce the workflow. The workflow may include step-by-step instructions for the task of the query received at 301. Step-by-step instructions associated with a task may be accessed from a plurality of storage locations, may be put together using information from data storage locations and/ or secondary sources, and/or the like. For example, the system may access a manual, Internet source, entity-specific resource, and/or the like, that may already have step-by-step instructions for performing the task. In this case, the system may simply retrieve these instructions and utilize them when producing the workflow. As another example, the system may determine that step-by-step instructions are not accessible or would be incomplete to respond to the exact query. Thus, in this case, the system may pull information from one or more sources to generate step-by-step instructions that would respond to the query.

To identify the information needed to create the instructions and respond to the query, identify the information that can be used to respond to the query, and/or actually produce the query from the information, the system may utilize an artificial intelligence model. One model that may be utilized is a language model, which may include a small language model, a large language model (LLM), and/or the like, or a combination thereof. The language models may be used to analyze the query and then produce the workflow. The language models may be programmed to format the information that is aggregated in a specific format associated with the workflow. In other words, the language model is programmed so that the information that has been identified as relevant to the workflow is formatted for presentation as a workflow having separate steps. How the workflow is formatted may be partially dependent on the information contained within the user profile.

The model (which may be a different model than the language model utilized to format the information into a workflow) may also be utilized to access secondary sources or data storage locations and identify information relevant to the task. In other words, the model may be utilized to access and identify information which can be used to produce the workflow. Thus, accessing documentation may include utilizing an artificial intelligence framework to identify documentation related to a task from a secondary source including documentation related to a plurality of tasks. Additionally, producing the workflow based on the query may include transmitting the query to the artificial intelligence model, the artificial intelligence model ingesting the documentation, and the artificial intelligence model generating an output based upon the documentation.

To identify information that may be relevant to the task, the workflow generation system and associated artificial intelligence model may utilize one or more topic and/or processing models to identify documentation relevant to the query. For example, the workflow generation system may utilize a natural language processing technique or model, entity identification technique or model, and/or the like, to determine a topic and/or concept present in the query, and identify a desired result present in the query. In other words, the system can identify the task of the query. Additionally, and/or alternatively, the workflow generation system and associated artificial intelligence model may utilize one or more image analysis techniques in order to analyze and identify entities within images captured by the system or provided by the user. Similarly, the system may utilize audio analysis techniques to analyze and identify information contained within captured audio. These are merely illustrative examples and are not intended to be limiting as many other analysis techniques and models can be utilized to not only identify information contained within a query to identify a task, but also identify information from one or more data storage locations and/or secondary sources that may be applicable or relevant to the task.

While language models are particularly useful in analyzing input provided by a user and then responding to the user in a way that can be understood by the user, training a language model on all possible queries that could be received would be impractical. Thus, the system may utilize supporting models, processes, and/or techniques to identify information relevant to a task and also to produce the workflow. For example, in addition to a language model, the system may utilize a retrieval augmentation generation (RAG) process to optimize the output of the model. A RAG process is able to identify information contained within secondary sources or data storage locations that are relevant to a particular query or prompt. Thus, the RAG is able to optimize the output of a language model so that the output is the most responsive to the query. Alternatively, or additionally, the system may be programmed to only access information in a specified data store. For example, if the system is utilized within an entity, the system may be programmed to only access data stores of the entity. The RAG may still be useful in this situation, but may also not be necessary as the language model could be programmed to access that information. In other words, the model may be designed to access any possible secondary sources or may only be programmed to access a select number of type of sources, for example, the workflow generation system may be limited to the information that a manufacturer, user, and/or overarching entity, deems appropriate.

Subsequent to accessing documentation related to a task and identifying documentation relevant to a query when producing a workflow, the system may generate, by aggregating the information, step-by-step instructions for a task. The artificial intelligence model may produce an output based upon documentation found for a task. When performing this generating of the step-by-step instructions, the workflow generation system may account for the user interface a user is interacting with. Therefore, when producing a workflow, the workflow generation system may format an output generated by an artificial intelligence model in response to the query into a workflow compatible with the user interface. In the other words, the workflow generation system may ensure that a workflow produced may remain consistent with the user interface in use.

Then, after producing a workflow, the workflow generation system may present the workflow to the user in a user interface. Presenting the workflow to the user may include providing step-by-step instructions corresponding to the task provided in the received query. The workflow generation system may the entirety of the workflow to the user at one time. In other words, the workflow may include a plurality of steps that are provided to a user at a single instance. Additionally, or alternatively, presenting the workflow to a user may include presenting each step within the workflow separately within the user interface. Presenting each step of a workflow separately may include presenting a next step to a user upon completion of a previous step. In other words, the system would present a new step within the user interface or to the user after successful performance of a previous step.

Additionally, and/or alternatively, presenting each step of a workflow separately may include presenting each step per a determined time period. For example, the system may present each step of a workflow every 30 seconds until all steps have been provided. As another example, the workflow generation system may periodically present each step of workflow based upon a determined amount of time it takes for an average user to perform a step, a user-preferred rate of presenting a step, and/or the like. How the workflow is presented can be based upon user preferences, crowd-sourced information, information learned about the user by a model, and/or the like. It should also be noted that presentation of the workflow may be performed using one or more output modalities including, but not limited to, audible output, visual output, video output, image output, haptic output, and/or the like.

Presenting the workflow also include embedded any media associated with one or more of the steps within the step of the workflow. In other words, instead of conventional methods which, at best, include a link to a secondary source that may include media, the system is able to retrieve the media and embed it within the workflow at the appropriate step. In conventional solutions, any links are generally provided at the end of the workflow. However, in the described system and method, the media would be embedded within the appropriate step. This way the user can be presented with all information that may be relevant to the step at the time the user is performing the step. For example, if the system is able to access an image or video of the performance of the step or an image illustrating an object, the system would embed this image and/or video at the step that corresponds to the image and/or video. The system would be able to embed appropriate media, which may include a link where appropriate, in any of the steps that have corresponding media. Media may include images, videos, links, icons, audio files, screenshots, and/or the like.

Presenting the workflow to the user in a user interface by use of a workflow generation system may keep a workflow organized and easy to understand. Rather than receiving a workflow in a format inconsistent with a user interface, the workflow generation system ensures that the workflow is presented to a user in a way that assists a user with understanding each step required in order to perform a task successfully. However, a user may be unsure how to perform a step present in a workflow, cannot grasp instructions for performing a step present in a workflow, may require additional information surrounding a step present in the workflow, have a question with respect to a particular step within the workflow, and/or the like. When a situation of confusion and/or further instruction is required based upon a workflow presented to a user, the workflow generation system may accept additional queries directed to a particular step of the workflow.

Figure 4:
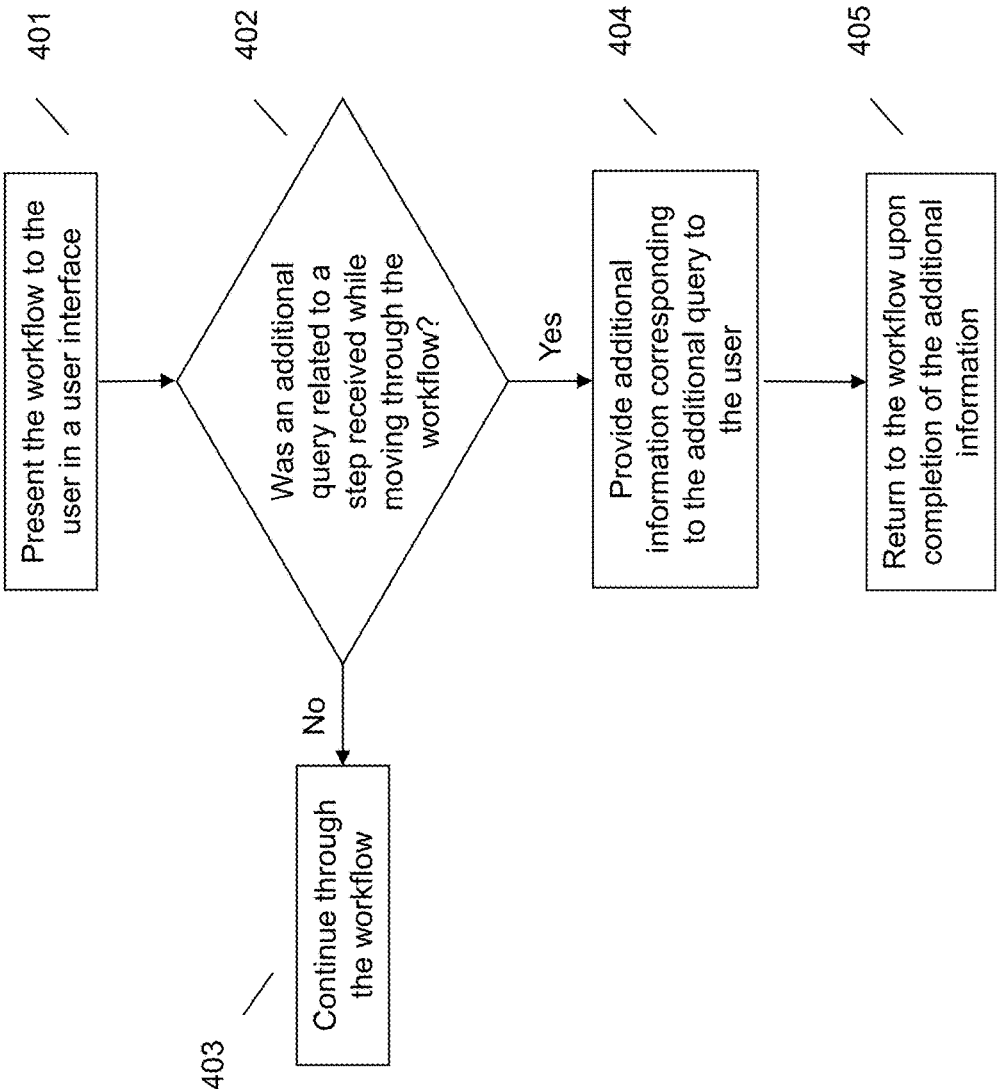
FIG. 4. illustrates an example method for providing information corresponding to an additional user query in the form of an additional workflow and returning back to an original workflow upon completion of the additional workflow.

Referring now to FIG. 4, an example method for providing information corresponding to an additional user query in the form of an additional workflow and returning back to an original workflow upon completion of the additional workflow is provided. FIG. 4 picks up where FIG. 3 finishes. Therefore, presenting the workflow to the user in a user interface at 401 coincides with presenting the workflow to the user at 303 of FIG. 3. Thus, while the workflow is being presented at 303/401, the system may receive an additional query related to the workflow and move to the steps of FIG. 4.

After presenting the workflow to the user in a user interface at 303/401, a user may move through the workflow while performing the steps provided in the workflow. As the user is moving through the steps of the workflow, questions associated with a step may come up. Whether it is because of confusion of a step, inability to perform a step, an inability to understand how to perform the step, and/or the like, a user may require further instruction and/or additional information associated with a step of the workflow. When such an issue arises, a user may provide an additional query associated with the step into the workflow generation system.

At 402, the workflow generation system may determine if an additional query related to a step was received while moving through the workflow. In other words, the workflow generation system may determine if additional information associated with a step of the workflow is requested by a user. In this step, the additional query can be received using any of the methods or inputs as previously mentioned. However, it should be noted that while it can be, it does not have to be using the same method as the original query was received. In other words, the original query may be received, for example, as a text-input and the additional query could be received as a text input, an audio input, a visual input, and/or the like. As a user is moving through an original workflow presented, the workflow generation system may determine with what step of the workflow the additional information is being requested. The workflow generation system may make a determination regarding what step the additional query is received for based upon the completion of previous steps present in a workflow, based upon what step is being currently presented to the user, based upon an indication of the user which specifically identifies the step, based upon monitoring of the user and identifying which steps the user has completed or appears to be struggling with, and/or the like.

When it is determined that an additional query related to a step is not received, the user and system may continue through the workflow presented per FIG. 3 at 403. In other words, a user will continue performing steps of the workflow presented until completion. However, when it is determined that an additional query is received, the workflow generation system may provide additional information corresponding to the additional user query at 404.

When providing additional information corresponding to the addition query of the user, the workflow generation system and associated artificial intelligence model may access documentation related to the query and identify documentation relevant to the query. In other words, to provide additional information and respond to the additional query, the system may utilize the same or similar techniques as described in connection with FIG. 3. However, the additional query received is not limited to being directed step-by-step instructions corresponding to a task. Rather, the additional information may be any type of additional information associated with a step of a workflow. For example, a step in a workflow generated per FIG. 3 may include, "remove the eggshell of a hard-boiled egg using a spoon," and the additional query received from the user at 402 may read, "do you have to use a spoon to remove the eggshell?" The system may then respond with the additional information, "no, you may use any utensil you like." Thus, providing additional information to an additional query does not require provision of additional steps, but, as per this example, simply answers a question. However, the system could also provide a workflow as the additional information. The additional information associated with a step of a workflow may be considered a branch of the workflow. At a branch, the additional information provided is not required to be associated with a step of a task.

Additionally, and/or alternatively, a branch of the workflow may be an additional workflow. In other words, providing additional information corresponding to the additional query may be provided as an additional workflow. When providing an additional workflow, the workflow generation system may determine that the additional query received may be associated with a task requesting steps in achieving a result. Subsequent to determining that the additional query received is associated with a task, the workflow generation system may supply a notification to a user requesting if a new workflow should be generated. Additionally, and/or alternatively, after determining the additional query received is associated with a task, the workflow generation system may automatically determine and generate an additional workflow for completion of a step associated with the additional information. Thus, in this case, the branch of the workflow may include an additional workflow for performing steps in order to successfully perform a step present in the original workflow. For example, the workflow for hard-boiling an egg may read, "peel the hard-boiled egg," and the user may provide the additional query, "how do I peel a hard-boiled egg?" The workflow generation system may determine that the additional query may require steps to perform the step present in the workflow. For example, the branch of the workflow may include the additional workflow, "tap a spoon around the circumference of the egg to crack the shell. Then separate the shell from the inner portion of the egg in multiple parts." The additional workflow present on the branch of the original workflow may assist with accomplishing a step of the original workflow. Then, upon completion of the additional workflow, the workflow generation system may determine that the step of the original workflow is complete.

A number of branches of a workflow is not limited. In other words, the system will accept any number of additional queries, thereby creating multiple additional branches. Additionally, additional queries could be received within an initial branch of the original query. In other words, the user may provide an additional query which results in the creation of a branch and, while in that branch, could provide an additional query related to that branch. Subsequent to identifying a context of a query, the system may store additional user queries in a data storage location corresponding to the context of the query in relation to the step of workflow. Such storing may be utilized by the system to further train the artificial intelligence model when providing a workflow to a user. Additionally, and/or alternatively, storing the additional queries of a user may be provided to a separate user providing a similar input query.

After the workflow generation system determines that the additional information corresponding to the additional query to the user is provided and/or completed, the system may return to the previous workflow at 405. This may be the original query workflow or may be an immediately preceding query workflow in the case that the additional query was obtained while already in a branch. The workflow generation system may provide as much additional information as requested by a user that is moving through a workflow and will return back to the original (or the immediately preceding) workflow.

The various systems presented herein disclose an advanced method for producing and presenting a workflow for a user in a user interface. Rather than relying on research and tedious organization, the current system and method provides a system that may generate a workflow based upon a request from a user, and further ascertains that the steps needing to be performed are performed in view or a desired result. The use of an artificial intelligence model and associated workflow generation system simplifies that steps required in order to understand, perform, and achieve a result. Additionally, unlike conventional solutions which, at best, include a link to secondary sources, the described system and method embeds media from secondary sources within the workflow. Thus, any information that the user might need to perform a task is included in a single location within the workflow. Additionally, the described system and method is able to allow a user to request additional information or ask a question with respect to one more steps within the workflow while performing the steps of the workflow. Thus, unlike conventional systems which only provide the steps of the current task without allowing the user to ask questions or request additional information, the described system and method provides a more user friendly system, intuitive, and efficient workflow generation process and system.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

receiving, at a workflow generation system of an information handling device comprising a user interface, a query from a user requesting step-by-step instructions corresponding to a task, wherein the task will be performed by the user to achieve a result, wherein the query is input directly into the user interface exhibited on the information handling device;

producing, utilizing an artificial intelligence model employed by the workflow generation system, a workflow based on the query, wherein the workflow comprises the step-by-step instructions to be performed by the user to achieve the result, wherein the producing comprises:

accessing documentation related to the task;

identifying information within the documentation relevant to the query; and generating, by aggregating the information, the step-by-step instructions, wherein the generating the step-by-step instructions comprises retrieving media related to the task and embedding the media into the step-by-step instructions of the workflow; and presenting, using a workflow generation system, the workflow to the user in the user interface exhibited on the information handling device, wherein the presenting the workflow comprises displaying the embedded media associated with one or more of the step-by-step instructions of the workflow;

wherein the retrieving the media associated with the one or more steps of the work flow comprises obtaining, utilizing the artificial intelligence model, the media from a secondary source without the user leaving the user interface exhibited on the information handling device.

2. The method of claim 1, comprising receiving, during the presentation of the workflow, an additional user query related to a step within the workflow.

3. The method of claim 2, comprising presenting information corresponding to the additional user query to the user within the user interface.

4. The method of claim 3, wherein the presenting information comprises producing an additional workflow related to the additional user query; and returning to the workflow upon completion of the additional workflow.

5. The method of claim 2, comprising identifying a context of the query and storing the additional user query in a data storage location corresponding to the context.

6. The method of claim 1, wherein the utilizing an artificial intelligence model comprises transmitting the query to the artificial intelligence model, the artificial intelligence model ingesting the documentation, and the artificial intelligence model generating an output based upon the documentation.

7. The method of claim 1, wherein the accessing documentation comprises utilizing an artificial intelligence framework to identify the documentation related to the task from the secondary source comprising documentation related to a plurality of tasks.

8. The method of claim 1, wherein the producing a workflow comprises formatting an output generated in response to the query into the workflow.

9. The method of claim 1, wherein the presenting the workflow to the user comprises presenting each step within the workflow separately within the user interface.

10. A system, the system comprising:

a processor;

a memory device that stores instructions that, when executed by the processor, causes the system to:

receive, at a workflow generation system of an information handling device comprising a user interface, a query from a user requesting step-by-step instructions corresponding to a task, wherein the task will be performed by the user to achieve a result, wherein the query is input directly into the user interface exhibited on the information handling device;

produce, utilizing an artificial intelligence model employed by the workflow generation system, a workflow based on the query, wherein the workflow comprises the step-by-step instructions to be performed by the user to achieve the result, wherein to produce comprises:

accessing documentation related to the task;

identify information within the documentation relevant to the query; and generate, by aggregating the information, the step-by-step instructions, wherein to generate the step-by-step instructions comprises retrieving media related to the task and embedding the media into the step-by-step instructions of the workflow; and present, using a workflow generation system, the workflow to the user in the user interface exhibited on the information handling device, wherein to present the workflow comprises displaying the embedded media associated with one or more steps of the step-by-step instructions of the workflow;

wherein the retrieving the media associated with the one or more steps of the work flow comprises obtaining, utilizing the artificial intelligence model, the media from a secondary source without the user leaving the user interface exhibited on the information handling device.

11. The system of claim 10, comprising receiving, during the presentation of the workflow, an additional user query related to a step within the workflow.

12. The system of claim 11, comprising presenting information corresponding to the additional user query to the user within the user interface.

13. The system of claim 12, wherein the presenting information comprises producing an additional workflow related to the additional user query; and returning to the workflow upon completion to the additional workflow.

14. The system of claim 11, comprising identifying a context of the query and storing the additional user query in a data storage location corresponding to the context.

15. The system of claim 10, wherein the utilizing an artificial intelligence model comprises transmitting the query to the artificial intelligence model, the artificial intelligence model ingesting the documentation, and the artificial intelligence model generating an output based upon the documentation.

16. The system of claim 10, wherein the accessing documentation comprises utilizing an artificial intelligence framework to identify the documentation related to the task from the secondary source comprising documentation related to a plurality of tasks.

17. The system of claim 10, wherein the producing a workflow comprises formatting an output generated in response to the query into the workflow.

18. A product, the product comprising:

a computer-readable storage device that stores executable code that, when executed by a processor, causes the product to:

receive, at a workflow generation system of an information handling device comprising a user interface, a query from a user requesting step-by-step instructions corresponding to a task, wherein the task will be performed by the user to achieve a result, wherein the query is input directly into the user interface exhibited on the information handling device;

produce, utilizing an artificial intelligence model employed by the workflow generation system, a workflow based on the query, wherein the workflow comprises the step-by-step instructions to be performed by the user to achieve the result, wherein to produce comprises:

accessing documentation related to the task;

identify information within the documentation relevant to the query; and generate, by aggregating the information, the step-by-step instructions, wherein to generate the step-by-step instructions comprises retrieving media related to the task and embedding the media into the step-by-step instructions of the workflow; and present, using a workflow generation system, the workflow to the user in the user interface exhibited on the information handling device, wherein to present the workflow comprises displaying the embedded media associated with one or more of the step-by-step instructions of the workflow;

wherein the retrieving the media associated with the one or more steps of the work flow comprises obtaining, utilizing the artificial intelligence model, the media from a secondary source without the user leaving the user interface exhibited on the information handling device.

\* \* \* \* \*